United States Patent [19]
Opravil

[11] 3,728,015
[45] Apr. 17, 1973

[54] COPYING APPARATUS

[75] Inventor: Egon Opravil, Hamburg-Bergedorf, Germany

[73] Assignee: Lumoprint Zindler KG, Hamburg, Germany

[22] Filed: May 3, 1971

[21] Appl. No.: 139,740

[30] Foreign Application Priority Data

May 5, 1970  Germany.....................P 20 21 833.1

[52] U.S. Cl..........................................355/8, 355/51
[51] Int. Cl. ................................................G03g 15/04
[58] Field of Search...........................355/3, 8, 50, 51

[56] References Cited

UNITED STATES PATENTS 3,458,255  7/1969  Limberger..........................355/76 X
3,510,218  5/1970  Limberget et al. .....................355/51
3,545,856  12/1970  Limberger..............................355/51
3,594,079  7/1971  Murgas et al.......................355/50 X

*Primary Examiner*—John M. Horan
*Assistant Examiner*—Kenneth C. Hutchison
*Attorney*—Toren and McGeady

[57] ABSTRACT

An improved copying apparatus with an exposure orifice on the upper surface of the apparatus and associated with a light source and a receiving surface, alongside which a copying material may be moved. A continuous transport arrangement with an inlet and an outlet slot is provided for foliate originals and a reciprocating transparent mounting for more bulky originals.

11 Claims, 7 Drawing Figures

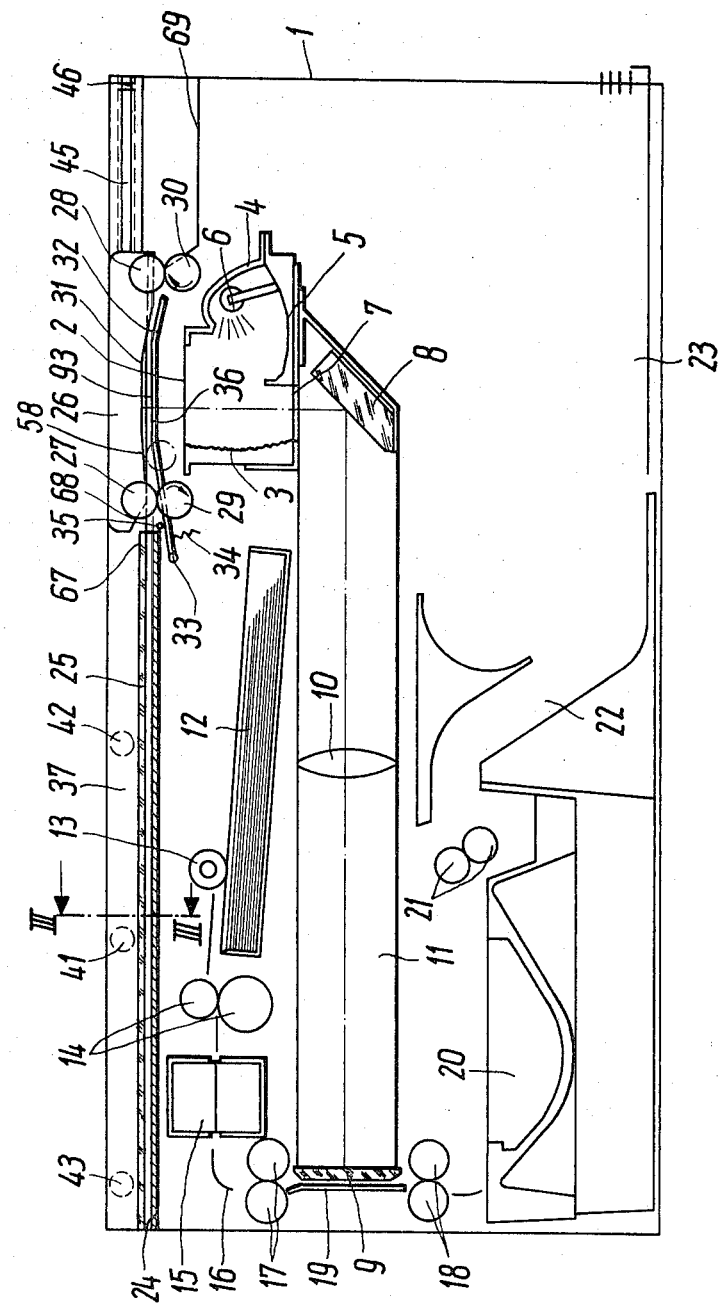

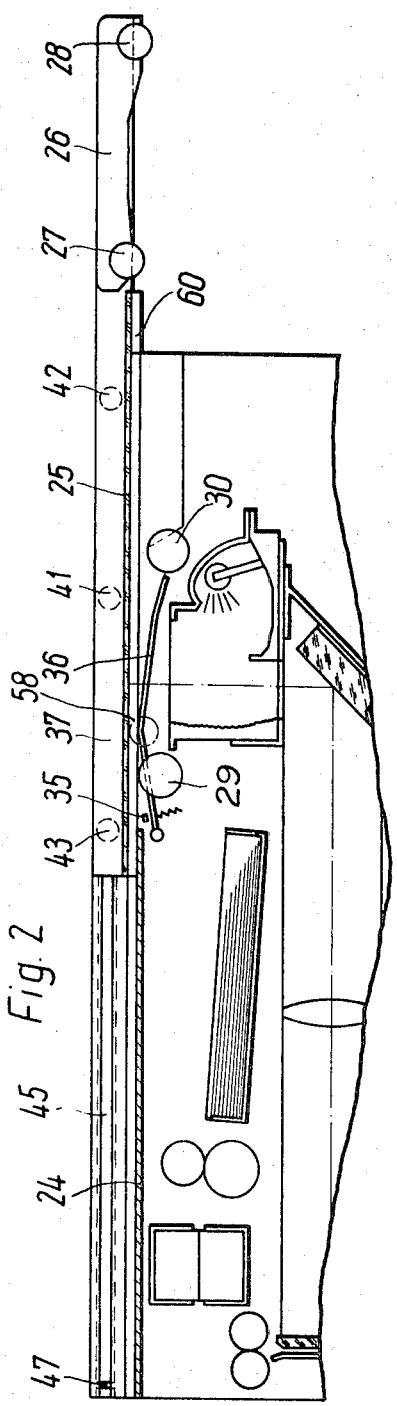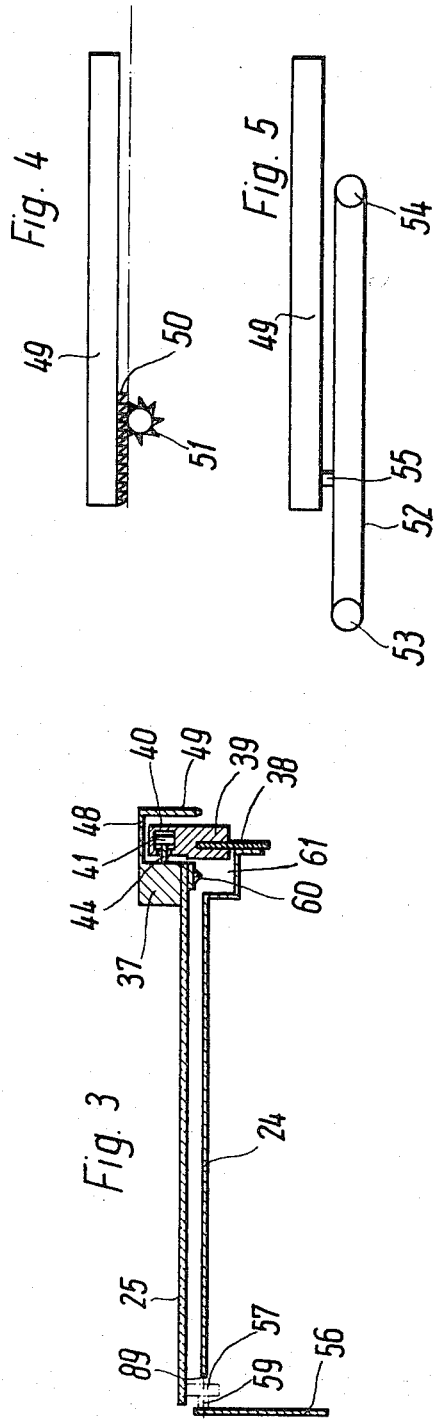

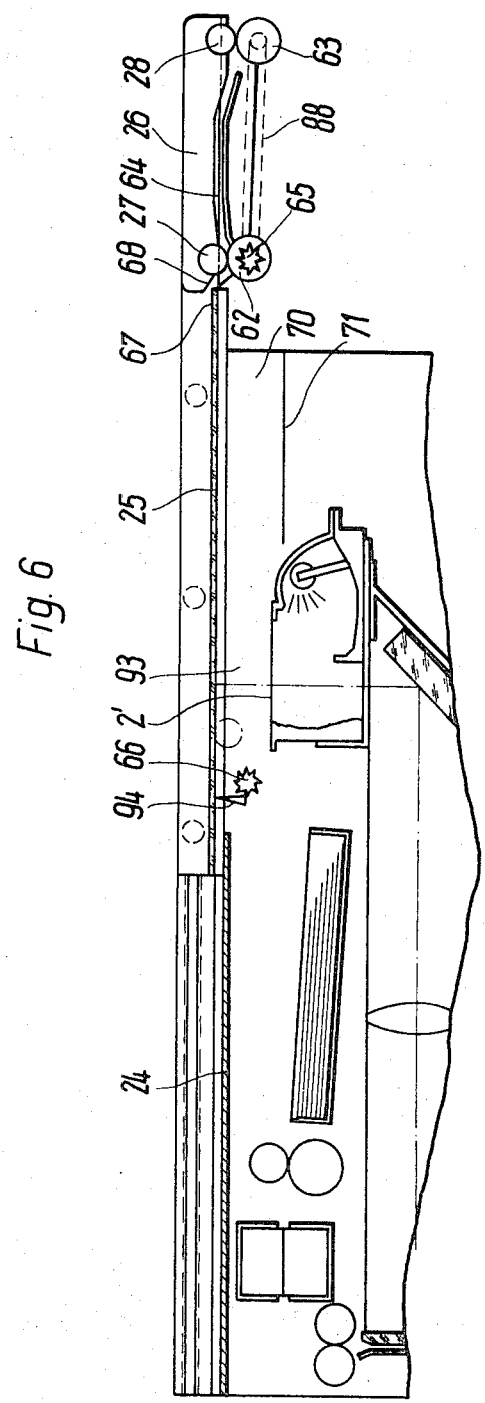

COPYING APPARATUS

BACKGROUND OF THE INVENTION

Copiers of the kind hereinbefore mentioned generally have a cover for the exposure orifice with pairs of transport rollers in front of and behind this orifice, of which one roller of each pair is positively driven. It is known for the lower roller to be rotatively driven and to entrain an upper roller in the frame-like cover, in order to pass a sheet-like original over the exposure orifice. It is also known to provide a transparent guide on the underside of the cover between the pairs of transport rollers which guides the original at a given distance in front of the exposure orifice.

Devices of this kind are well suitable for processing foliate originals.

In order to enable copies to be made also from thicker originals and from books, it is known to lift the cover with the upper rollers off the pairs of transport rollers. This enables the thicker and more bulky originals to be moved past the exposure orifice by the lower transport rollers which protrude partially from the upper surface of the apparatus in front of, and behind, the exposure orifice. It is merely necessary to place these bulkier originals on the driven rollers.

With a view to improve the guiding action for thicker originals, it is also known to raise or remove the cover, and arrange for a transparent mounting face to run after the manner of a slide over the projecting sections of the driven transport rollers. Such a transparent mount, for example a glass plate, may be deposited on the upper side of the copier, adjacent to the cover when the same is in its lowered or fitted operating position. After use it is only necessary to return the glass plate after one pass back into its starting position.

This combination of processing a foliate original with a mounting surface for book-shaped originals makes it possible to process both types of originals in a continuous method; book-shaped originals are copied by using a slide system, while sheets are merely introduced into slots and immediately transported and books are placed on a movable glass plate. Since it is always necessary to return such a glass plate for the next copying pass, the production rate of copies from book-shaped originals is substantially slower than the processing of foliate originals which can be inserted practically immediately one after the other into the receiving slot and moved only in one direction. Compared with other systems in which a reciprocating carriage with a transparent mounting surface is arranged above the exposure orifice, this system offers certain advantages. Obviously, foliate and thicker originals may be placed on the transparent mounting surface of the carriage, which must be returned to its starting position, even if only a single copy is to be made. If only a single carriage is used, the number of to and fro movements may be easily preselected by using a reversible drive, so that several copies can be made from one and the same original; however, only one direction of the reciprocating movement of the carriage is utilized in this construction.

SUMMARY OF THE INVENTION

It is an object of the invention to provide a copier in which the advantages of all the systems hereinbefore mentioned are combined by providing a continuous transport mechanism for foliate originals with an inlet and an outlet slot, and a reciprocatingly movable transparent mounting surface for thicker originals, adapted to be moved at choice for a certain number of strokes across the exposure orifice, without requiring the manual return of the mounting surface.

It is a further object of the invention to provide an improved copier of the type hereinbefore described in which the cover, incorporating at least the upper rollers of the pairs of transport rollers and a transparent mounting surface, arranged fixedly to the cover on a side extending parallel to the axes of the pairs of transport rollers, is constructed as a displaceable carriage, whereby the transparent mounting surface is adapted to move together with the simultaneous movement of the cover with at least a part of the pairs of transport rollers in one direction across the exposure orifice and in another direction back to its starting position.

In this manner, the cover need no longer be constructed as a frame adapted to be removed or raised, which requires an additional working step, so that the cover need no longer be worked at all by the operator. In spite of the normal arrangement of the cover above the exposure orifice, the transparent mounting surface is always ready to be moved across the delivery orifice.

Obviously, at least in the centre zone of the carriage, the transparent mounting surface terminates at a sufficient distance from the cover to enable foliate originals to pass over the edge of the mounting surface to the first pair of transport rollers.

Preferably the carriage is provided with drive means for producing a reciprocating movement, such as is well known in the art.

It is a further object of the invention to provide an improved photocopier with a transparent guide for the foliate original under the cover and between the pairs of transport rollers, wherein the transparent guide reaches to the level of the mounting surface and is pivotable in the apparatus and adapted to be pivoted by a pressing down element on the carriage within the zone of the transparent mounting surface out of the path of movement of the latter. In a construction of this kind the lower driven rollers are preferably mounted stationarily in the apparatus.

It is a further object of the invention to provide an improved photocopier in which both rollers of the pairs of transport rollers and a transparent guide between the said pairs of rollers are located on the carriage and adapted to be moved out of the zone of the exposure orifice together with the cover.

Preferably a track is fitted on at least one side into a longitudinal wall of the housing, and support rollers for the carriage are guided therein. Preferably the track has the shape of a T-groove open towards the carriage, through the slot of which project the axes of support rollers guided on the top and bottom inside the T-groove. In this manner, the carriage may travel with the cover by a certain distance beyond the housing of the apparatus, more particularly during the movement of the mounting surface across the exposure orifice, without incurring the risk of tilting.

A guide of this kind need only be provided on one side. Preferably the carriage, and particularly the transparent mounting surface, is guided on one side on supporting rollers arranged on one longitudinal side wall of the housing.

Preferably the T-groove contains limit stops defining the end positions of the carriage.

It is a further object of the invention to provide an improved photocopier of the kind hereinbefore mentioned in which the drive means comprise a gear which meshes continuously. In another embodiment the drive means comprise an endless cable pull, with a pin mounted thereon which is connected to the carriage. A solution of this kind is already known from other constructions.

The drive means comprise further preferably a reversible motor, causing the to and fro movement of the carriage in accordance with a cycling control, so that always the whole transparent mounting surface is moved across the exposure orifice; during the movement in one direction the exposure light source is switched on, and during the movement in the other direction it is switched off.

BRIEF DESCRIPTION OF THE DRAWINGS

The invention will be further explained, by way of example, with reference to the accompanying drawings, showing embodiments thereof, and in which:

FIG. 1 is a diagrammatical side elevation of the apparatus according to the invention, showing the apparatus in cut away position with the essential functional elements exposed;

FIG. 2 is a partial side elevation of an apparatus in accordance with FIG. 1 in another operational position;

FIG. 3 is a cross-section along the line III—III in FIG. 1;

FIG. 4 is a partial side elevation of FIG. 3 viewed from the right and explaining one embodiment of the drive;

FIG. 5 is a side elevation corresponding to that of FIG. 4 and explaining another embodiment of the drive;

FIG. 6 is a side elevation corresponding to FIG. 2, showing another embodiment in the operating position corresponding to that in FIG. 2;

In all Figures of the drawings, corresponding parts and units are indicated by the same reference numerals.

DESCRIPTION OF THE PREFERRED EMBODIMENTS

Figure 7:
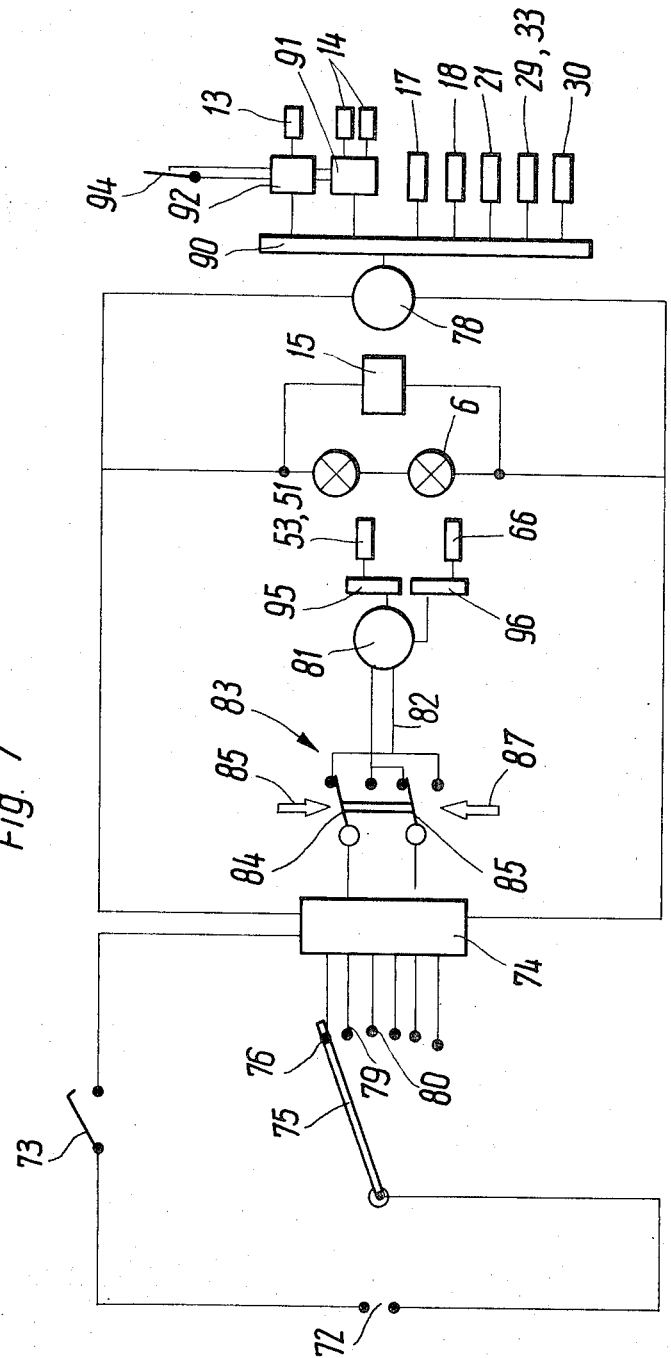
FIG. 7 is a diagrammatical circuit diagram of the actuating means for the carriage, including a control for the exposure light source.

The photocopier according to the invention comprises a housing 1 with an upwardly open exposure orifice 2, which may be closed by a transparent plate; three reflectors 3, 4, 5 are arranged adjacent to and below the exposure orifice 2. Within this reflector arrangement, there is at least one exposure light source 6, the light of which is so directed by the reflectors that the exposure orifice is well illuminated without direct light incidence, and direct light incidence into a passage 7 of the reflector arrangement, located opposite the exposure orifice, is avoided. Under the passage, there is an element 8 for deflecting the rays towards a receiving surface 9. An optical arrangement 10 may be mounted between the element 8 and the receiving surface 9.

Above an exposure channel 11, screened by wall portions, a stack of copying material is arranged in a stack holder 12. Behind the stack holder 12 which cooperates with a withdrawing mechanism 13, there is a transport and control device with rollers 14, whereby the copying material is fed into the processing section in a controlled manner, using switching means and limit stops, not described in detail, and located within the zone of the passage of the original past the exposure orifice.

Obviously, the stack holder may also be replaced by a reel of copying material in conjunction with a cutter.

The processing section may comprise, for example, a charging device 15, a deflector plate 16 to a pair of transport rollers 17 upstream of the receiving surface 9 and a pair of transport rollers 18 downstream of the receiving surface. A guide plate 19 is arranged between the pairs of transport rollers and provides a smooth guide for the copying material along the receiving surface.

Under the pair of transport rollers 18, there is a developing section 20, downstream of which there is a further pair of transport rollers 21 for transporting the copying material through a curved channel 22 into a delivery tray 23. A drier, not shown, may be provided in front of the delivery tray.

The arrangement in accordance with the invention is not limited to the use of a charging device 15, and to a corresponding copying method, which has been given merely by way of example. In principle, the invention is suitable for any method operating with an exposure.

FIG. 1 shows an embodiment of the apparatus in an operating position for processing foliate originals.

A carriage is mounted on the upper wall 24 of an apparatus, forming an aperture above the exposure orifice 2. This carriage consists of a transparent plate 25, e.g., of glass, forming the mounting surface, and the transparent plate is fixedly secured to a cover 26, in which freely rotatable transport rollers 27, 28 are mounted. These transport rollers are parts of pairs of transport rollers, the other rollers of which are shown at 29 and 30. In the position of the carriage shown in FIG. 1, the transport rollers 27, 28 are pressed resiliently against their cooperating transport rollers 29, 30 driven in the direction indicated by arrows. Under the cover 26, the lower surface 31 of which is raised into a plane slightly below the upper surface of the transparent plate 25, there is a transparent guide 32, conforming to the surface 31. This guide 32, which may be partly of sheet metal, is fixed in the embodiment of FIGS. 1 and 2 at its end shown in FIG. 1 under the glass plate 25, to a hinge 33 so that it can be hinged upwardly. A compression spring 34 tends to urge the guide upwardly against a stop 35, so that there is a gap between the surface 31 and the guide 32 adapted to receive the copying material. The line of contact between rollers 27, 29 and 30, 28 is substantially in the centre of the gap. In the centre zone 36, the guide 32 is open, i.e. it has a perforation corresponding substantially to the exposure orifice.

The carriage formed from the transparent plate 25 and the cover 26 has on one side (see FIGS. 1 to 3) a raised edge flange 37 located adjacent to a raised edge flange 39 of a rear partition or longitudinal wall 38 of the housing. A T-groove 40, open towards the centre of the apparatus, is provided in flange 39 and contains rollers 41, 42, 43, the axes 44 of which are mounted in the edge flange 37. The diameter of the support rollers 41 through 43 is such that they are slightly smaller than the vertical dimension of the inner part of the T-groove, thereby preventing the carriage with the transparent plate 25 and the cover 26 from tilting even in the position shown in FIG. 2. The lateral slot 45 of the T-groove extends over the whole length of the apparatus and may be closed at its ends by limit stops 46, 47, of which at least one stop 47 may be detachable to facilitate the fitting of the carriage. Under normal operation, these limit stops have the object of fixing the end positions of the carriage in conjunction with the axes of the support rollers 42, 43.

The flange 37 has an arm 48 overlying the flange 39, and a downwardly directed leg 49 which is connected to actuating means for the carriage. As shown in FIG. 4, the leg 49 extends over the whole length of the carriage, corresponding to the flange 37 or to the overall length of the transparent plate 25 and the cover 26. The lower edge of the long leg forms a rack 50 which meshes with a pinion 51 of the actuating mechanism; for example, the pinion 51 may be mounted on a shaft passing through the wall 38. It may be seen that the pinion 51 is adapted to collaborate with the carriage 25, 26 in any position of the latter.

According to FIG. 5, an endless belt 52 may be guided about drive rollers 53, 54 on the outside of the wall 38 and mounted therein, and of which at least one is driven by the drive motor of the apparatus. The drive motor itself will be explained further below with reference to FIG. 7.

The belt 52 is connected by a pin 55 with the long leg 49, thereby entraining the carriage 25, 26 during the reciprocating movement of the belt 52.

It may be seen from FIG. 3 that on the side wall 56 of the apparatus, opposite the side wall 38, there are provided internal guide or support rollers 57, 58, of which roller 58 is also shown in FIG. 1. A plurality of these guide rollers are provided over the length of the apparatus. These rollers are mounted idly on axes 59 in the side wall 56 and extend beyond the top wall 54 through corresponding slots 89. The guide rollers 57, 58 are arranged at such a height relative to the support rollers 41 through 43 that the carriage or the transparent plate 25 is retained and guided horizontally.

Since the lower surface 31 is upwardly convex and the guide 32 projects correspondingly into the plane of the transparent plate 25, one side of the carriage is equipped in the zone of the plate 25, for example under the upright flange 37, with a holding down rail 60 acting on one side of the guide 32. This holding down rail is shown best in FIG. 2, in which the guide 32 is in a downwardly pivoted position. The holding down rail 60 protrudes through a slot 61 in the top wall 24.

Regarding the guide 32, it should be noted that it has a recess in the zone of transport roller 29. The transport roller 29 consists preferably of several axially associated roller sections. Suitably dimensioned flanges of the guide 32 are adapted to move in the gaps between these sections when the guide is pivoted.

FIG. 6 shows a further embodiment of the apparatus in an operating position corresponding to that of FIG. 2, in which the transparent plate 25 is located above the exposure orifice 2', i.e. in a position in which copies can be made from thicker originals. However, in this embodiment transport rollers 62, 63, corresponding to the transport rollers 29, 30, and a plate 64, corresponding to the guide 32 are mounted firmly on the carriage under the cover 26 and movable with the carriage. Here, the exposure orifice 2' is slightly lower than in FIGS. 1 and 2 to enable the transport roller 62 to pass over the exposure orifice. The shaft of the transport roller carries a drive gear 65 which meshes with a drive gear 66 in the apparatus in the return position of the carriage (operating position according to FIG. 1) to provide a drive for the pairs of transport rollers 62, 27 and 63, 28, for copying foliate originals. Between the transport rollers 62, 63, a cable pull 88 may be provided to furnish an additional drive also for the transport roller 63.

In this embodiment, it is unnecessary to provide a hingeable guide 32 in accordance with FIG. 1.

In both embodiments the edge 67 of the transparent plate 25 facing the cover 26 terminates at a sufficient distance from pairs of transport rollers 27, 29 and 27, 62, respectively, and under a sloping guide surface 68 on the cover 26 so that foliate originals fed over the surface of the transparent plate 25 can pass between rollers 27, 29, or 27, 62 into the channel between the cover 26 and the guide 32 or 64, respectively.

It may also be seen from FIG. 1 that the top wall 24 has on its right end, as viewed in FIG. 1, a recess, step-shaped section 69, through which the foliate originals are delivered. In FIG. 6, the top wall is recessed in this zone as at 70, in order to run the lower part of the carriage out laterally together with the transport rollers 62, 63. Under the recess is a wall section 71 on which foliate originals may be deposited.

FIG. 7 shows a circuit arrangement and the associated drive connections. A power connection 72 passes through a main switch 73 to a switchbox 74 with a selector switch 75, the different positions of which energize different switching contacts for different numbers of copies, in order to provide a corresponding number of reciprocating cycles of the carriage. In the switchbox 74, contacts 79, 80, . . . are associated with repeater circuits corresponding to the desired number of copies.

A contact, for example contact 76, serves merely for activating a drive motor 78 for internal parts of the apparatus, such as the withdrawing mechanism 13, rollers 14, 17, 18, 21, 29, 30, 33 and other drive means, and for energising the exposure light sources 6 and the charging device 15. Downstream of the drive motor 78 there is a transmission 90 for the parts to be connected. Obviously, special coupling devices 91, 92 serve to connect and disconnect the roller of the withdrawing device 13 and the roller 14 which are adapted to collaborate with a cycling circuit as a function of the introduction of an original, when this drive is activated through contacts 76, i.e. a foliate original is manually fed under the cover 26. Such circuits are already known. To this end a stop switch 94 may be provided in front of the orifice 93 in the cover 24 above the exposure orifice 2, as shown, by way of example, in FIG. 6. A corresponding switch is also provided in the other embodiments. It is operated by the leading edge of an original upon insertion in order to trigger off a sheet of copying paper from the stack 12.

All other contacts 79, 80 . . . switch simultaneously a drive motor 81 for the drive means of the carriage 25, 26, i.e. for example the gear 51 or one of the rollers 53, 54. The connection 82 comprises a reversing circuit shown generally at 83. Its reversing elements 84, 85 are parts of switches collaborating with stops 86, 87, corresponding to the stops 46, 47 in FIG. 1 and 2, so that the desired number of reciprocating cycles is obtained according to the choice of contacts 79, 80.

Behind drive motor 81 there is a transmission 95 to which are connected, respectively, the parts 51 and 53. In the embodiment of FIG. 6 the parts 29, 33, 30 may be replaced by drive wheel 66 connected to the transmission 90 through a special transmission 96, wherein the transmission 96 transmits the drive only in one direction. For example, in one direction the exposure light source 6 might be switched off if it is connected suitably to the directional circuit 83.

I claim:

1. A copying device including a housing, an exposure orifice located within said housing, a top plate forming the upper surface of said housing and located above said exposure orifice, said top plate having an aperture located above said exposure orifice, an exposure device located within said housing, a receiving surface positioned within said housing and spaced from said exposure orifice, said exposure device comprising a light source and deflecting means for directing a light beam from said light source to said reflecting surface, means within said housing for transporting copying material past said receiving surface, wherein the improvement comprises a cover movably mounted on said housing and positionable between a first position located above the aperture in said top plate and a second position displaced laterally from the aperture in said top plate, pairs of transport rollers for moving an original to be copied over the aperture in said top plate in the direction of movement of said cover from its first to its second position, at least one pair of said transport rollers located on the downstream side of the aperture in the direction of the movement of the original over the aperture and at least one other pair of said transport rollers located on the upstream side of said aperture, each said pair of transport rollers comprising an upper roller, a lower roller and drive means for at least one of said upper and lower rollers, each of said upper rollers of said pairs of transport rollers being mounted in said cover for displacement therewith, a transparent mounting surface secured to said cover on the downstream side thereof relative to the direction of movement of the original over the aperture, a displaceable carriage movable over said top plate of said housing and comprised of said cover, the transparent mounting surface and at least said upper rollers of said pair of transport rollers, and means for movably supporting said carriage for movement between the first and second positions of said cover.

2. A copying device, as set forth in claim 1, wherein the edge of said transparent mounting surface adjacent the downstream side of said cover is spaced a sufficient distance from the downstream side edge of said cover to enable foliate originals to pass over the edge of said transparent mounting surface adjacent said cover and under said cover into said one pair of said transport rollers located on the downstream side of said aperture.

3. A copying device, as set forth in claim 1, wherein means are arranged for displacing said carriage and said means comprise a driving means positioned within said housing and driven means mounted on said carriage for engagement with said driving means for movably displacing said carriage.

4. A copying device, as set forth in claim 1 wherein a transparent guide for a foliate original is pivotally mounted in said housing above said exposure orifice in the zone of the aperture in said top plate, the pivot axis of said transparent guide extends transversely of the direction of movement of a foliate original past the aperture in said top plate, stop means mounted in said housing for limiting the upward movement of said transparent guide about its pivot axis, spring means positioned within said housing for urging said transparent guide against said stop means, and a holding down device positioned on said carriage and extending along said transparent mounting surface in the direction of movement of said carriage and arranged to contact said transparent guide for swiveling said guide out of the path of said carriage during the displacement of said cover between its first and second positions.

5. A copying device, as set forth in claim 1, wherein both said upper rollers and said lower rollers of each said pairs of transport rollers are mounted in said cover, a transparent guide for a foliate original extending between said pairs of transport rollers on the downstream and upstream sides of the aperture in said top plate, said transparent guide located above the aperture in said top plate when said cover is in its first position and said transparent guide is displaced with said cover from above the aperture in said top plate when said cover is in the second position.

6. A copying device, as set forth in claim 5, including a drive gear located on said lower roller of said pair of rollers located on the downstream side of the aperture in said top plate when said cover is in its first position, transmission means extending between said lower roller of said pair of transport rollers on the downstream side and said lower roller of said pair of transport rollers on the upstream side, and a second drive gear mounted within said housing and arranged to mesh with said drive gear on said lower roller when said cover is in its first position located above the aperture in said top plate.

7. A copying device, as set forth in claim 1, wherein said means for movably supporting said carriage comprises an elongated track positioned along one side of said top plate of said housing which side extends in the direction of movement of said carriage, and support rollers mounted on said carriage and guided in said track for effecting the movable support of said carriage during its movement.

8. A copying device, as set forth in claim 7, wherein said track has a groove of T-shaped cross section extending in its elongated direction, said T-shaped groove forming a slot in said track facing toward said carriage, and said supporting rollers positioned within said T-shaped groove with the axles of said rollers extending through the slot formed by said groove.

9. A copying device, as set forth in claim 7, wherein openings are formed in the side of said top plate of said hosuing opposite the side on which said track is located, at least one supporting roller positioned in each of said openings and supported in said housing, said supporting rollers extending upwardly through the opening in said top plate to the undersurface of said transparent mounting surface for supporting said transparent mounting surface as it is moved along with said carriage.

10. A copying device, as set forth in claim 8, wherein abutments are provided within said T-shaped groove at spaced positions therein for determining the end positions of the movement of said carriage as said cover moves between its first and second positions.

11. A copying device, as set forth in claim 3, wherein said driving means comprises a reversable drive motor for effecting a reciprocating to and fro movement of said carriage in accordance with a cycling control, so that said transparent mounting surface is moved across the aperture in said top plate, stops located in the path of said carriage, switching means cooperating with said stops and connected to said drive motor for determining the direction of rotation of said drive motor, and a switch connected to said drive motor for actuating said drive motor, said switch being positioned in the circuit of said light source so that said light source is switched on when said cover is moved in one direction between its first and second positions and is switched off when said cover is moved in the other direction between its first and second positions.

* * * * *